C. F. DILG.
BALL BEARING.
APPLICATION FILED APR. 6, 1910.
1,117,943.
Patented Nov. 17, 1914.
2 SHEETS—SHEET 1.
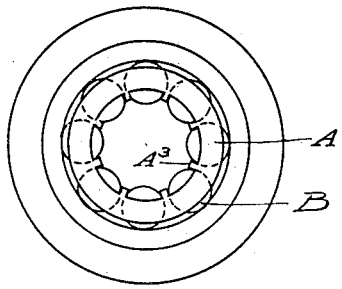
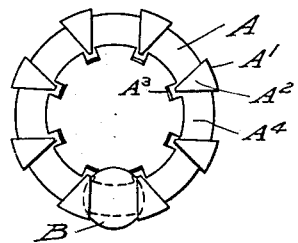
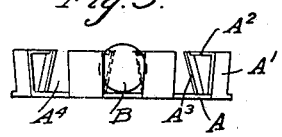
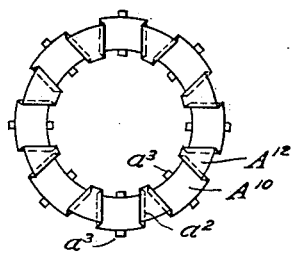
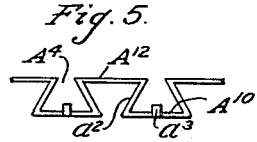
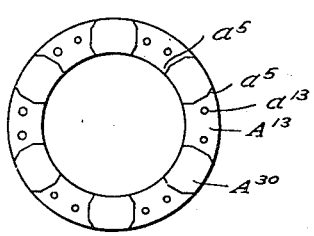
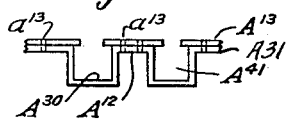
WITNESSES:
INVENTOR
C. F. Dilg
BY
ATTORNEY

C. F. DILG.
BALL BEARING.
APPLICATION FILED APR. 6, 1910.

1,117,943.

Patented Nov. 17, 1914.
2 SHEETS—SHEET 2.

WITNESSES:
R. H. Smith.
H. Stouffer.

INVENTOR
C. F. Dilg
BY J. O. Fowler
ATTORNEY

UNITED STATES PATENT OFFICE.

CHRISTIAN F. DILG, OF NEW YORK, N. Y., ASSIGNOR TO CHARLES H. J. DILG.

BALL-BEARING.

1,117,943.  Specification of Letters Patent.  Patented Nov. 17, 1914.

Original application filed October 18, 1897, Serial No. 655,652. Divided and application filed February 16, 1900, Serial No. 5,434. This continuation application filed April 6, 1910. Serial No. 553,898.

*To all whom it may concern:*

Be it known that I, CHRISTIAN F. DILG, a citizen of the United States of America, and a resident of New York, in the county and State of New York, have invented a certain new and useful Ball-Bearing, of which the following is a specification, the same being a continuation of my application Serial No. 5,434, filed February 16, 1900, the latter being a division of Serial No. 655,652, October 18, 1897.

My invention relates to ball holding devices, and particularly to that class of ball bearings wherein a holder is used, having a series of ball bearing points to retain the balls, the latter projecting beyond the device, in the inner and outer, and in the upper directions with respect thereto, and it has for its object the provision of an organization of the class described, simple in construction, inexpensive to manufacture, and which operates in a smooth, easy and noiseless manner in practical use.

To attain the desired end, this, my invention, consists in the construction, arrangement and operation of the parts herein set forth.

Figure 10:
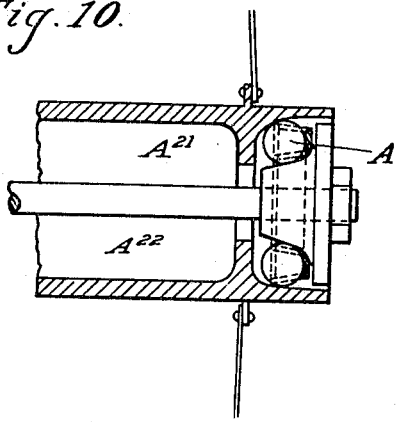
Figure 11:
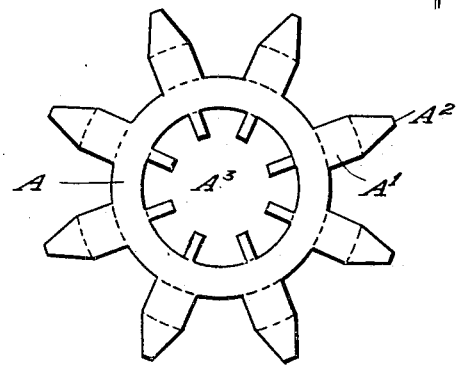
Figure 12:
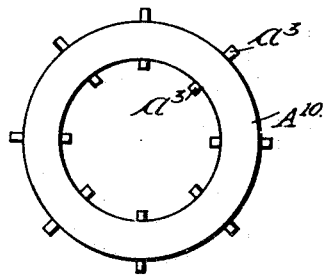
Figure 13:
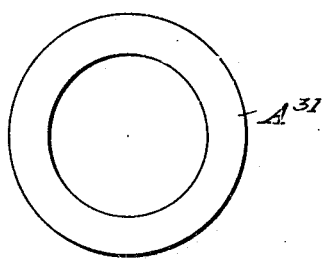

In the drawings which accompany and form a part of this specification, Figure 1 represents a plan view of a ball holder embodying my invention, Fig. 2 is a plan, and Fig. 3, is a front elevation of my ball retainer, Figs. 4 and 8 are plan views of two ball holding devices constructed according to my invention, Figs. 5, 6, 7 and 9 are views in detail of some modified forms of my ball holding devices embodying my invention, Fig. 10 is a longitudinal section of a portion of a hub with one of my ball retaining devices; and Figs. 11, 12 and 13 are respectively views of blanks of which the retaining devices shown in Figs. 2, 4 and 8 are made.

Like letters of reference indicate like parts in all the views.

I have found it desirable to devise a ball bearing of simple construction, and one that will be reliable and efficient, as well as noiseless, in practical use, in which the balls are held in their normal positions by means of a retaining device, and I have, therefore, constructed according to my invention, an organization of the kind set forth, embodying the preferred construction of parts and their mutual relationship, combination, arrangement and organization in a composite body or structure, as hereinafter described.

Referring particularly to the drawings, A denotes my ball holding device formed of suitable material such as resilient sheet metal, and shown as located in the chamber formed by the inner flanges of the hub $A^{21}$, and the cones of the axle $A^{22}$, of the present embodiment, and comprising ordinarily a practically horizontal and imperforate ring having a series of inner and outer disconnected projections or spurs serving as bearing points or detents, to retain the balls B, and consisting, as in Figs. 1 to 3, of inner, and also preferably wider, and outer, and practically vertical, side flaps or upwardly and circumferentially extending projections $A^3$, $A^1$, ordinarily radially opposite each other, and extending upwardly from the ring, and also preferably tapering extensions or top portions or plates $A^2$, practically parallel with and overhanging the ring A, and having their free ends bent over so that they contact or lie adjacent the tops of the projections opposite to the ones from which they extend. Intermediate each pair of inner and outer flaps or projections, spaces or recesses $A^4$ are formed. The spaces or recesses thus formed are so arranged that the balls contained in them are spaced apart, or, in other words, are prevented from contacting with each other, and thereby the element of friction caused by the adjacent surfaces of the rotating balls rubbing against each other in opposite directions is eliminated.

I sometimes construct my ball holding devices in the form of a corrugated ring, as shown in Figs. 4 to 7. In this instance, the edges of the walls of the recesses $A^4$ formed between the upper portions $A^{12}$ of the ring, are preferably parallel with each other, and the same extend upward above the center line of the balls B; the side walls $a^2$ of the same, in connection with the bottom portion of said ring, constituting the recesses $A^4$; which walls $a^2$ are preferably inclined toward the balls in order that the upper portions of each recess will be somewhat smaller than the lower part thereof. My bearing points or detents consist, in this instance, of one or more vertical prongs, as $a^3$ in Fig. 5, located in the inner and outer portions of the recess $A^4$, or lateral prongs, as $a^4$ in Fig. 6, located along the inner and outer edges of the side inclined portions of my ring A. If preferred, however, the parts of my ring, forming the lower portions of said recesses, may be of circular form, as $A^{20}$, shown in Fig. 7, or they may be rectangular, as $A^{30}$, Figs. 8 and 9, constituting the recesses $A^{41}$, and to the upper portions, as $A^{31}$, supplementary plates $A^{13}$, provided with projecting retaining portions or points $a^5$, formed by the same being laterally recessed or concaved, the said top portions being wider at their outer edge than at the inner edge thereof.

Referring to the form of my invention illustrated in Figs. 2 and 3, which for some purposes is the one I prefer, it will be evident that the projections $A^3$, which coöperate with the other parts of the retainer to hold the balls in place, are of such relation to the top retaining portions $A^2$ as to prevent the seated balls from falling out of their recesses in a direction toward the said parts $A^2$. These plain or non-flanged parts $A^3$, as is clear from an examination of Fig. 11, are integral with the base ring, being attached to one edge thereof, and when they are bent up into position to complete the retainer they constitute retaining portions, along one edge of the base ring, and being turned upward opposite the parts $A'$, they serve to render the base relatively stiff at those points as regards the relatively elastic parts $A'$ $A^2$.

In the preferred form of my invention, the ball-retaining device consists of a ring-shaped portion or base A constructed with a series of ball-retaining portions $A'$ (otherwise herein termed standards) rising or springing from one edge or margin of the base and terminating in tapering extensions or top-retaining projections $A^2$ (otherwise herein termed sector-shaped or tapering or inwardly flaring flanges or extensions) which are arranged at an angle to the parts $A'$ and overlie the base. From the edge of the ring or base A opposite the ball-retaining parts $A'$ extend the up-turned ball-retaining parts of the retainer designated $A^3$, and which, as already stated constitutes a broken wall or rib along the edge of the ring, the inoperative parts of the retainer, located between the parts $A^3$, being cut away. This construction permits the balls to be sprung into the spaces or recesses $A^4$ formed for receiving and confining them between the adjacent retaining parts $A'$, $A^2$, $A^3$, being retained in such recesses by contact with the up-turned portions $A^3$ at the edge of the ring and the overlying portions $A^2$, when the retainer is removed from the ball race or bearing.

It is manifest that various omissions of some particulars could be made without materially affecting the essential features of my invention, or the operation of the remaining parts, and I do not therefore, wish to be limited to the specific structural details of the organization set forth herein. Obviously, the elements of the structure described may be located at an angle to the plane in which they are shown. I, accordingly, use the words "horizontal," "vertical," and the like, in a relative sense.

In operation, the balls B, are placed in the recesses between each pair of inner and outer bearing points or projections, and top bearing points, so that they project beyond the same in the inner and outer and in the upper directions. The balls are thus securely held in place, and, by means of the construction shown, are allowed to move quite a long distance radially, and they are thus enabled to adjust themselves, in case of any wearing of the bearing taking place, the side bearing points, as stated, preventing the balls from rolling out of their sockets, in either a vertical, radial or lateral direction, and, since the base or the retaining projections or both are elastic, the balls may be readily snapped in and out of the retainer, at will.

Obviously, my ball retaining device may be advantageously employed in many kinds of bearings or sockets, and I do not therefore wish to limit myself to the use of my device in connection with ball bearings of the kind shown alone.

I only claim in this application, together with the generic invention disclosed in the construction of a device of the class described and shown herein, the specific ball retainer shown in Figs. 1 to 3, as the specific ball retainer shown in Figs. 4 to 9 is claimed in a companion application.

As it is evident that many changes in the construction and relative arrangement of parts might be resorted to without departing from the spirit and scope of my invention, I would have it understood that I do not restrict myself to the particular construction and arrangement of parts shown and described, but that such changes and equivalents may be substituted therefor, and that

What I claim as my invention, is:—

1. A ball holding device for ball bearings comprising a ring-shaped base and a plurality of disconnected elastic members projecting up from one face thereof forming a plurality of independent ball-receiving spaces and including portions partially overhanging the said spaces, whereby the elastic members will spring apart and permit the insertion of balls into the said spaces and will spring back again after the insertion of the balls and the balls will be retained against outward escapement by the overhanging portions.

2. A ball holding device for ball bearings composed of sheet metal and comprising an elastic imperforate ring-shaped base and a plurality of disconnected elastic members projecting up from one face thereof forming a plurality of independent ball-receiving spaces and including portions partially overhanging the said spaces, whereby the elastic members will spring apart and permit the insertion of balls into the said spaces and will spring back again after the insertion of the balls and the balls will be retained against outward escapement by the overhanging portions.

3. A ball holding device for ball bearings composed of sheet metal and comprising an elastic imperforate ring-shaped base and a plurality of disconnected lugs or spurs projecting up from one face thereof forming a plurality of independent ball-receiving spaces, and angular portions partially overhanging the said spaces, whereby the elastic members will spring apart and permit the insertion of balls into the said spaces and will spring back again after the insertion of the balls and the balls will be retained against outward escapement by the overhanging portions.

4. In a ball bearing, a ball holding device consisting of a flat ring having a series of inner and a series of outer side flaps radially opposite each other and extending upwardly from the ring, and balls held in the spaces between the inner and outer flaps so that they project beyond the ring and side flaps in the inner and outer and in the upward directions.

5. In a ball bearing, a ball retaining device consisting of a flat ring having inner upwardly extending flaps and outer upwardly extending flaps of a larger width opposite the inner flaps and being provided with tapering extensions which are so bent that they come in contact with the tops of the inner flaps.

6. The combination of a hub having inner flanges with an axle having cones forming chambers with the said flanges, and in each chamber a ball retaining device consisting of a flat ring having inner upwardly extending flaps and outer upwardly extending flaps of a greater width opposite the inner flaps and provided with tapering extensions which are so bent that they come in contact with the tops of the inner flaps, and balls held between the corresponding inner and outer flaps, and projecting beyond the top portion of the device and the inner and outer sides of the same.

7. For a ball retaining device for ball bearings, a blank consisting of a flat ring having inner flaps and outer flaps, the latter being of a larger width than the inner flaps and being provided with tapering extensions.

8. A ball holding device consisting of a ring having inner and outer projections or retaining portions opposed to each other, one of each pair of projections being provided with an extension to form a top portion bent over and turned toward the top of the opposite retaining portion, and balls held in the spaces between the projections, so that they can turn in any direction and desirable that the draft-bar should also be yond the device in the inner and outer and in the upper directions.

9. A ball holding device consisting of a ring having inner and outer retaining portions opposed to each other, one of said retaining portions comprising a plurality of longitudinal converging extensions to form top portions, and balls held in the spaces between the retaining portions so that they can turn in any direction and their spherical bearing surfaces project beyond the device in the inward and outward and in the upward directions.

10. A ball holding device for ball bearings formed of sheet metal and consisting of a flat imperforate ring-shaped base upon which the balls are adapted to rest and having elastic retaining portions disconnected from one another and forming independent ball-receiving spaces adapted to contain balls with their spherical bearing surfaces projecting from their respective spaces in an inward, outward, and upward direction, and means for preventing the balls from escaping in an upward direction.

11. A ball holding device formed of sheet metal, and consisting of a ring having elastic inner and outer projections or retaining portions of unequal width, balls held in the spaces between the projections or retaining portions so that they can turn in any direction, and their spherical bearing surfaces project beyond the device in the inward and outward and in the upward directions, and means to prevent the balls from moving in an upward direction.

12. A ball holding device for ball bearings formed of sheet metal and consisting of a flat elastic imperforate ring-shaped base upon which the balls are adapted to rest, integral elastic retaining portions projecting up from one face thereof and disconnected from one another and forming independent ball-receiving spaces adapted to contain balls with their spherical bearing surfaces projecting from their respective spaces in an inward, outward, and upward direction, and means for preventing the balls from escaping in an upward direction.

13. A ball holding device for a bearing comprising an imperforate elastic base of ring or annular shape, upon which the balls are adapted to rest, and retaining elastic spurs, lugs or projections extending upward from one face of the base and arranged to retain the balls between them.

14. A ball holding device for a bearing comprising an elastic base of ring or annular shape, and retaining elastic spurs, lugs or projections, each separate from the others and projecting from one face of the base.

15. A ball holding device formed of sheet metal, and having a base portion and provided with ball retaining portions rising approximately vertically from the said base portion and having their free ends bent at an angle so as to lie in a plane approximately parallel with the plane of the base so as to allow the balls to be repeatedly sprung in and out of the completed retainer, and to resume their normal positions after each operation, and provided with other co-operating retaining means, said ball holding device being constructed and arranged to support the balls so that their spherical bearing surfaces project beyond the retainer in the inward and outward and upward directions, and to control the vertical, radial and lateral movements of the said balls, and to prevent the escape of the balls from the holder.

16. In a sheet metal ball holding device, a base, a series of integral projections rising approximately vertically from one edge or margin of the said ring and having their free ends bent at an angle so as to lie in a plane approximately parallel with the plane of the base, and ball retaining means on the edge of the base opposite the aforesaid projections, the whole being constructed and arranged to retain balls so that they shall project from the bearing in the inward and outward and upward directions, and may be snapped in and out of the same at will.

17. A ball retaining device for ball bearings, consisting of a ring shaped portion or base having a series of spaced flaps rising at the inner margin only of the base, and another series of spaced flaps, provided with tapering extensions, rising at the outer margin of the base, the free ends of the extensions overhanging the said base.

18. In a ball-retaining device for ball bearings, in combination, a base and a plurality of parts extending at an angle from the plane of the base, and also a plurality of parts extending from the last mentioned parts substantially parallel to the plane of the base, the said parallel extending parts being wider at their outer edges than at their inner edges.

19. In a ball-retaining device for ball bearings, in combination, a base and a plurality of parts extending at an angle from the plane of the base, and also a plurality of parts extending from the last mentioned parts substantially parallel to the plane of the base, the said parallel extending parts having substantially straight ball-engaging sides and being wider at their outer edges than at their inner edges.

20. A ball-holding device for ball bearings composed of sheet metal and comprising an imperforate base of ring or annular shape upon which the balls are adapted to rest, and retaining spurs, lugs or projections extending upward from one face of the base and shaped to retain the balls between them and to space the balls.

21. In a ball-retaining device for ball bearings, in combination, a ring-shaped portion or base, a plurality of intermediate parts extending at an angle from the base, and a series of parts extending from the last mentioned parts and overhanging the base and adapted to space the balls and prevent them from escaping outwardly from the base.

22. A ball retaining device for ball bearings consisting of a ring shaped portion or base and a series of spaced standards rising at one margin of the base, and having their free ends extended to overhang the base, and retaining portions rising from the base opposite the said standards.

23. A ball retaining device for ball bearings consisting of a ring shaped portion or base and a series of spaced standards rising at one margin of the base, and having their free ends extended to overhang the base, and retaining portions rising from the base opposite the said standards, the base support for the balls being thereby rendered relatively stiff, and the standards being relatively elastic, whereby balls may be confined without preventing rotation thereof.

24. A ball-retaining device for ball bearings consisting of a ring shaped portion or base and a series of spaced standards rising at one margin of the base and having their free ends extended to overhang the base, and a broken or interrupted barrier rising from the base opposite the said standards and adapted to prevent the balls from escaping in an inward direction.

25. A ball retaining device for ball bearings consisting of a ring shaped portion or base and a series of spaced standards rising at one margin of the base, and having their free ends extended to overhang the base, the opposite edges of said extension being converging and retaining portions rising from the base opposite the said standards.

In testimony of the foregoing specification, I do hereby sign the same in the city of New York, county and State of New York, this second day of March, 1910.

CHRISTIAN F. DILG.

Witnesses:
H. ADOLPH WINKOPP,
CHAS. H. J. DILG.